(12) United States Patent
Kung et al.

(10) Patent No.: US 7,496,793 B2
(45) Date of Patent: Feb. 24, 2009

(54) ERROR REPORTING METHOD AND SYSTEM

(75) Inventors: Kuang-Yung Kung, Guangdong (CN);
Sheng-Ju Chen, Guangdong (CN);
Ming-Yu Tsai, Guangdong (CN)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 355 days.

(21) Appl. No.: 11/308,739

(22) Filed: Apr. 27, 2006

(65) Prior Publication Data
US 2007/0094538 A1    Apr. 26, 2007

(30) Foreign Application Priority Data
Oct. 21, 2005   (CN)   ................ 2005 1 0100593

(51) Int. Cl.
*G06F 11/00*   (2006.01)
(52) U.S. Cl. ........................................ 714/36
(58) Field of Classification Search ............. 714/25–27, 714/30–36, 46, 48, 52, 57
See application file for complete search history.

(56) References Cited

U.S. PATENT DOCUMENTS

| | | | | |
|---|---|---|---|---|
| 5,704,035 A | * | 12/1997 | Shipman | 714/42 |
| 6,401,218 B1 | * | 6/2002 | Linam et al. | 714/25 |
| 6,543,047 B1 | * | 4/2003 | Vrhel et al. | 717/121 |
| 6,654,816 B1 | * | 11/2003 | Zaudtke et al. | 710/1 |
| 6,731,206 B2 | * | 5/2004 | Yang et al. | 340/500 |
| 6,807,035 B1 | | 10/2004 | Baldwin et al. | |
| 6,862,695 B2 | * | 3/2005 | Lin | 714/36 |
| 2005/0183069 A1 | * | 8/2005 | Cepulis | 717/128 |

FOREIGN PATENT DOCUMENTS

CN   1431593 A   7/2003

* cited by examiner

*Primary Examiner*—Nadeem Iqbal
(74) *Attorney, Agent, or Firm*—Winston Hsu

(57) ABSTRACT

An error reporting method is used for reporting errors in testing a computer system. The error reporting method includes the following steps: testing the computer system to find errors; generating an error code corresponding to a specific error during the test; and displaying the error code. An error reporting system being used for reporting errors in testing a computer system is also disclosed.

18 Claims, 6 Drawing Sheets

| 8421 BCD Failure Code | | | | | | | | Hex Failure Code | ERROR |
|---|---|---|---|---|---|---|---|---|---|
| Bit 7 | Bit 6 | Bit 5 | Bit 4 | Bit 3 | Bit 2 | Bit 1 | Bit 0 | | |
| 0 | 0 | 0 | 0 | 0 | 0 | 0 | 1 | 0x01 | Get CPU Type Error |
| 0 | 0 | 0 | 0 | 0 | 0 | 1 | 0 | 0x02 | CPU Initiation Fail |
| 0 | 0 | 0 | 0 | 0 | 0 | 1 | 1 | 0x03 | Memory Test Error |
| 0 | 0 | 0 | 0 | 0 | 1 | 0 | 0 | 0x04 | Hard Disk Check Error |
| 0 | 0 | 0 | 0 | 0 | 1 | 0 | 1 | 0x05 | PCI Initiation Error |
| 0 | 0 | 0 | 0 | 0 | 1 | 1 | 0 | 0x06 | Check Sum Error |
| 0 | 0 | 0 | 0 | 0 | 1 | 1 | 1 | 0x07 | Power Sequence Error |
| 0 | 0 | 0 | 1 | 0 | 0 | 0 | 1 | 0x11 | Cache Initiation Fail |
| 0 | 0 | 0 | 1 | 0 | 0 | 1 | 0 | 0x12 | ROM Pilot Initiation Fail |
| 0 | 0 | 0 | 1 | 0 | 0 | 1 | 1 | 0x13 | VGA Initiation Fail |
| 0 | 0 | 0 | 1 | 0 | 1 | 0 | 0 | 0x14 | Keyboard Initiation Fail |
| 0 | 0 | 0 | 1 | 0 | 1 | 0 | 1 | 0x15 | Configuration Test Error |
| 0 | 0 | 0 | 1 | 0 | 1 | 1 | 0 | 0x16 | Mouse Test Fail |
| 0 | 0 | 0 | 1 | 0 | 1 | 1 | 1 | 0x17 | Parity Check Error |

FIG. 4

| STATE | | | | 8421 BCD Failure Code | Hex Failure Code |
|---|---|---|---|---|---|
| Twinkle State | First LED | Second LED | Third LED | | |
| Quick-Twinkle | Light-off | Light-off | Light-on | 00000001 | 0x01 |
| Quick-Twinkle | Light-off | Light-on | Light-off | 00000010 | 0x02 |
| Quick-Twinkle | Light-off | Light-on | Light-on | 00000011 | 0x03 |
| Quick-Twinkle | Light-on | Light-off | Light-off | 00000100 | 0x04 |
| Quick-Twinkle | Light-on | Light-off | Light-on | 00000101 | 0x05 |
| Quick-Twinkle | Light-on | Light-on | Light-off | 00000110 | 0x06 |
| Quick-Twinkle | Light-on | Light-on | Light-on | 00000111 | 0x07 |
| Slow-Twinkle | Light-off | Light-off | Light-on | 00010001 | 0x11 |
| Slow-Twinkle | Light-off | Light-on | Light-off | 00010010 | 0x12 |
| Slow-Twinkle | Light-off | Light-on | Light-on | 00010011 | 0x13 |
| Slow-Twinkle | Light-on | Light-off | Light-off | 00010100 | 0x14 |
| Slow-Twinkle | Light-on | Light-off | Light-on | 00010101 | 0x15 |
| Slow-Twinkle | Light-on | Light-on | Light-off | 00010110 | 0x16 |
| Slow-Twinkle | Light-on | Light-on | Light-on | 00010111 | 0x17 |

FIG. 5

ERROR REPORTING METHOD AND SYSTEM

FIELD OF THE INVENTION

The present invention generally relates to error reporting methods and systems, and more particularly to an error reporting method and system for reporting errors during a start-up of a computer.

DESCRIPTION OF RELATED ART

Computers such as desktop computers, portable computers, are widely used to process information. A general computer includes many hardware components, such as a main board, a central processing unit (CPU), an enhanced graphics adaptor (EGA) card, and a read only memory (ROM), including many software components, such as an operating system and a basic input/output system (BIOS). The basic input/output system is one of the more important programs and is stored in the read only memory.

When the computer is powered up, the basic input/output system will test the working states of the hardware components by a power on self-test. After the power on self-test, if no error is found, the operating system will be loaded. Whereas, if any errors are found, the computer will generate warning signals to report the errors.

A general error reporting method of the computer is done by using various warning sounds generated by a speaker that is mounted on the mainboard, to indicate the errors from the various components. For instance, a sound with a long beep may indicate an error from the ROM, while another sound with a long beep and two short beeps may indicate an error from the enhanced graphics adaptor (EGA) card.

The aforementioned error reporting method is widely used in computers at present. However, in practice, the warning sounds can't be clearly heard especially when the computer is located in a noisy environment.

Therefore, an error reporting method and an error reporting system for a computer system is desired in the industry to address the aforementioned deficiencies and inadequacies.

SUMMARY OF THE INVENTION

An error reporting method is used for reporting errors in testing a computer system. The error reporting method includes the following steps: testing the computer system to find errors; generating a error code corresponding to a specific error during the test; and displaying the error code.

Other systems, methods, features, and advantages of the present error reporting method and the error reporting system will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF DRAWINGS

Many aspects of the present error reporting method and system can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

FIG. 4 is a chart showing relationships between errors of the computer and states of the displaying module;

FIG. 5 is a chart showing relationships between error codes and the states of the displaying module;

DETAILED DESCRIPTION

Reference will now be made to the drawings to describe preferred embodiments of the present error reporting system and method.

Figure 1:
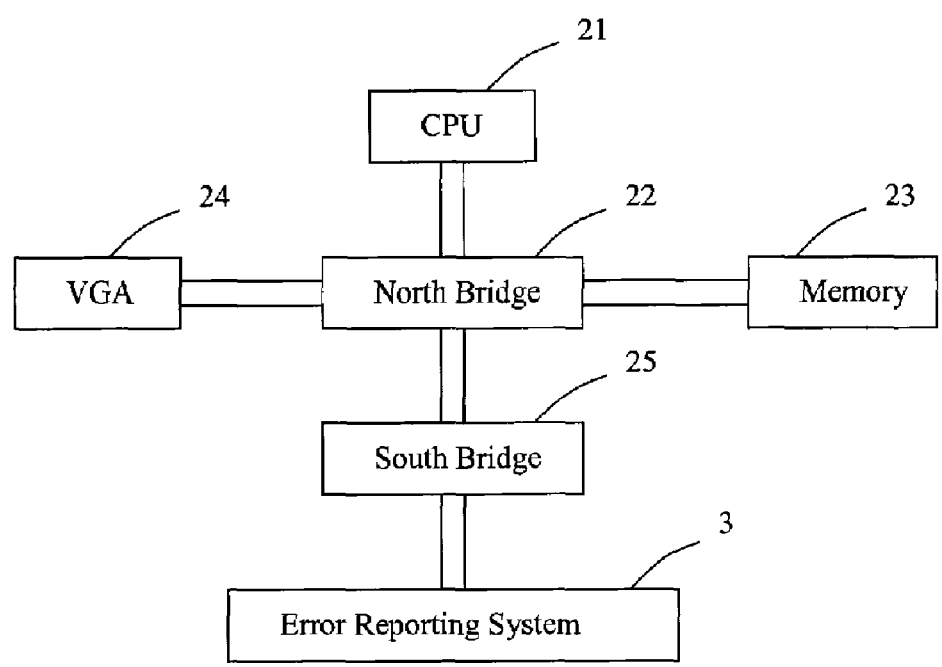
FIG. 1 is a block diagram of a computer system in accordance with an exemplary embodiment, the computer system including an error reporting system.

Referring to FIG. 1, a computer system 2 includes a plurality of hardware components, such as a central processing unit (CPU) 21, a north bridge 22, a memory 23, an enhanced graphics adaptor (EGA) 24, and a south bridge 25. The north bridge 22 is electronically connected to the central processing unit 21, the memory 23, and the enhanced graphics adaptor 24. The central processing unit 21 is used to access the memory 23 and control the enhanced graphics adaptor 24 via the north bridge 22. The north bridge 22 is used to transmit information and commands between the central processing unit 21 and other components such as the memory 23 and the enhanced graphics adaptor 24. An error reporting system 3 is used in the computer system 2 for testing and reporting errors from the hardware components during a power on self-test. The error reporting system 3 communicates with the north bridge 22 via the south bridge 25.

Figure 2:
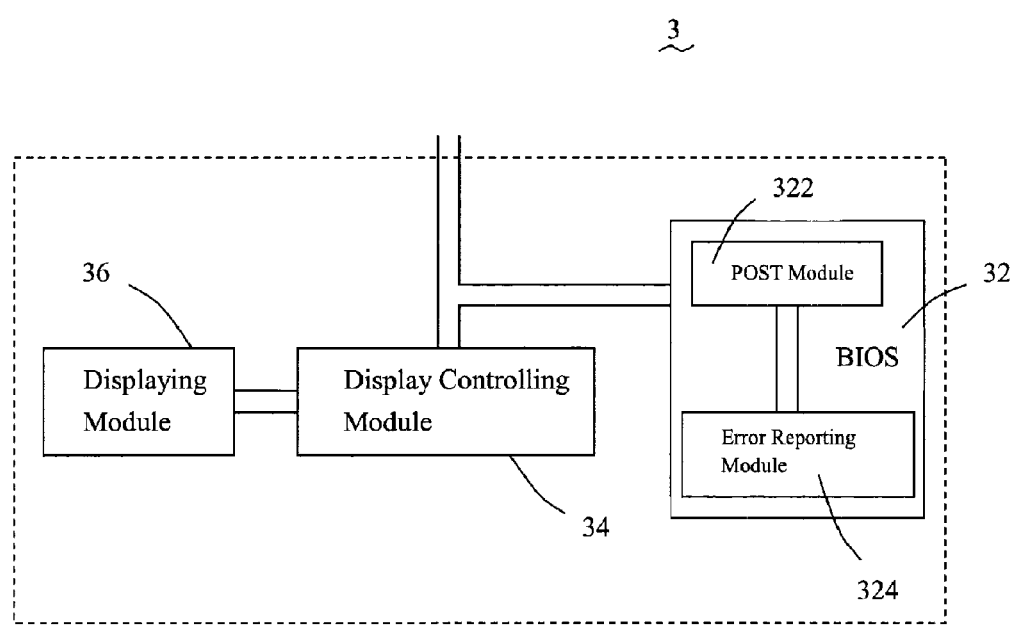
FIG. 2 is a block diagram of the error reporting system of FIG. 1, the error reporting system including a displaying module.

Referring also to FIG. 2, the error reporting system 3 includes a basic input/output system 32, a display controlling module 34, and a displaying module 36. The basic input/output system 32 includes a power on self-test module 322 for starting up the power on self-test of the computer system 2, and an error reporting module 324 for generating error codes corresponding to specific errors found during the power on self-test. The display controlling module 34 is used for activating the displaying module 36 to display the error codes.

After the computer system 2 is powered up, the power on self-test module 322 starts up the power on self-test of the computer system 2, so as to test states of the hardware components such as the central processing unit 21, the memory 23, and the enhanced graphics adaptor 24. If an error is found during the test, the power on self-test module 322 transmits this error to the error reporting module 324. The error reporting module 324 generates an error code and a display command based on the specific error found by the power on self-test module 322, and transmits the error code and the display command to the display controlling module 34. The display controlling module 34 activates the displaying module 36 to display the error code in response to the display command.

Figure 3:
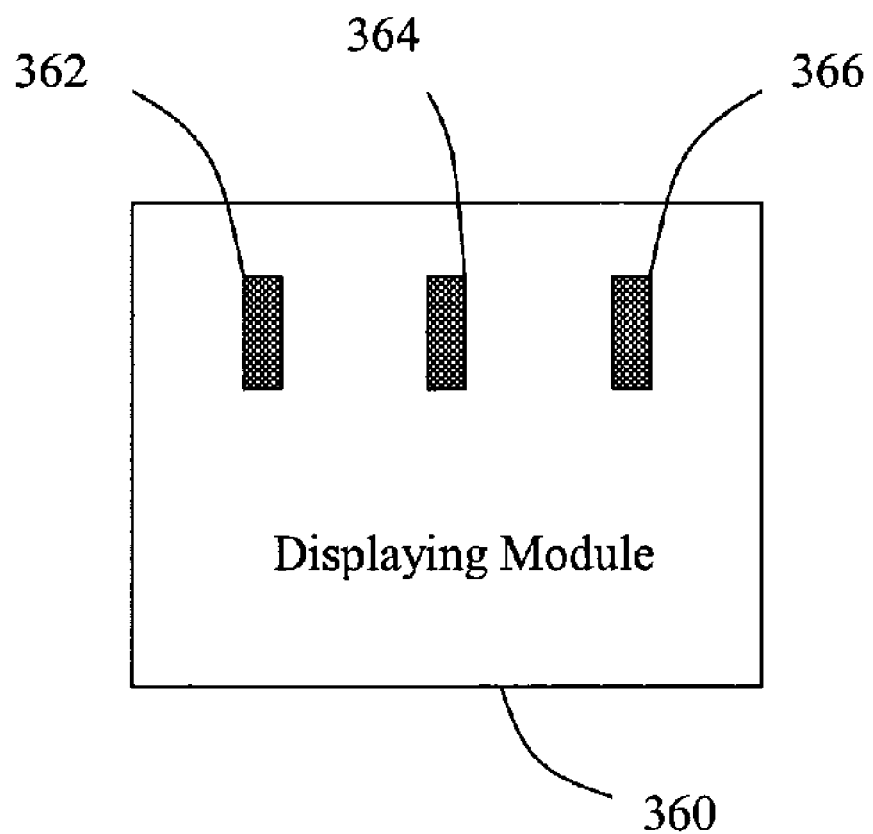
FIG. 3 is a schematic diagram of the displaying module of FIG. 2.

Referring to FIG. 3, the displaying module 360 includes a plurality of indicators such as a first indicator 362, a second indicator 364 and a third indicator 366. Each indicator 362, 364 and 366 has a light-on state and a light-off state. The light-on state further includes a quick-twinkle state and a slow-twinkle state. The light-on state can be combined with one of the two twinkle states. Therefore, by permutation and combination, the displaying module 360 may have up to fifteen states. However, when all indicators 362, 364 and 366 stay in the light-off state, the display module 360 stay in the light-off state and there is no error in the test. So fourteen states are used to indicate the errors codes.

Referring to FIG. 4, a 8421 binary coded decimal (BCD) error code including eight bits is used to indicate a corresponding error. In the error code, a Bit4 is used to represent the twinkle states, a Bit2 is used to represent the first indicator 362, a Bit1 is used to represent the second indicator 364, a Bit0 is used to represent the third indicator 366, and the other four Bits are set to "0". For the bit4, the quick-twinkle state of the displaying module 36 is set to "0", while the slow-twinkle state of the displaying module 36 is set to "1". For the bits 0, 1, and 2, the light-on state of each indicator is set to "1" while the light-off state is set to "0". Therefore, each specific error corresponds to a corresponding 8421 BCD error code. Furthermore, the 8421 BCD error code can be converted into a simpler hex error code. For instance, if only the third indicator 366 gets into the slow-twinkle state, the 8421 BCD error code is "00010001" and its corresponding hex error code is "0x11"; the specific error is "Cache Initiation Fail".

Referring to FIG. 5, a state of the displaying module 360 can indicate a corresponding 8421 BCD error code or a corresponding hex error code. For example, if the displaying module 36 gets into the quick-twinkle state, the first indicator 362 gets into the light-off state, the second indicator 364 gets into the light-off state, and the third indicator 366 gets into the light-on state, then the state of the displaying module 360 can indicate an 8421 BCD error code "00000001", and may also indicate an hex error code "0x01". Thus, the fourteen states of displaying module 360 can indicate fourteen specific 8421 error codes or fourteen hex error codes.

Figure 6:
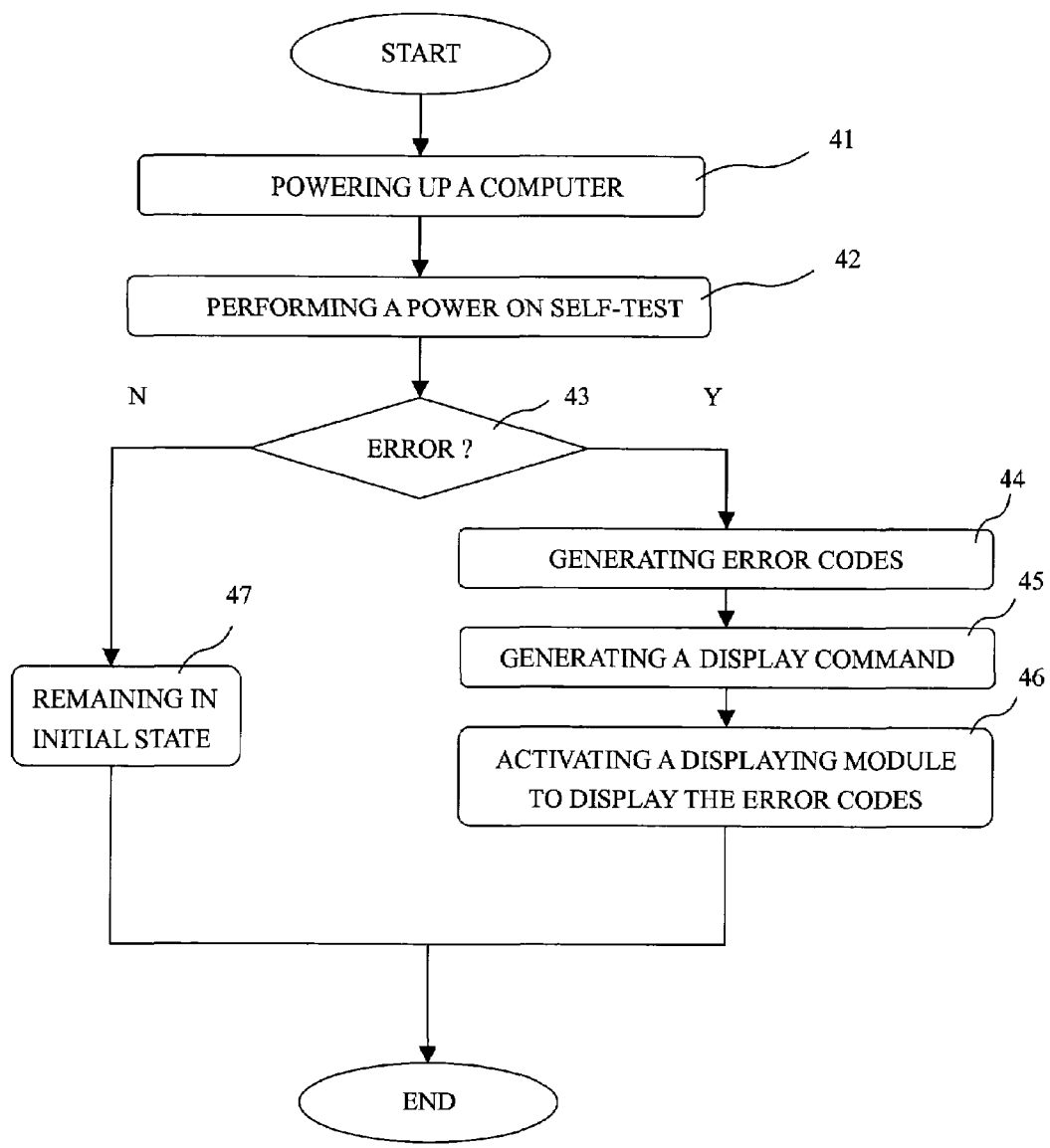
FIG. 6 is a flow chart illustrating an error reporting method in accordance with an exemplary embodiment.

Referring to FIGS. 1, 2, and 6, an error reporting procedure of an error reporting method for the computer system 2 is illustrated. To begin with, the displaying module 36 is set to an initial state with all indicators being in the light-off states. Firstly, in step 41, the computer system 2 is powered up. Then in step 42, the error reporting system 3 performs the power on self-test. In step 43, a determination is made to determine whether a specific error occurs during the power on self-test. In step 44, if an error occurs, an error reporting module 324 generates an error code corresponding to a specific error, and sends the error code to the display controlling module 34. In step 45, the error reporting module 324 also generates a display command and sends the display command to the display controlling module 34. In step 46, a displaying module 36 is activated to display the error code by the controlling module 34. In step 47, if no error occurs, the displaying module 36 stays remains in the initial state.

The error reporting system 3 and the error reporting method employs the displaying module 36 to display the error codes. Therefore, the error reporting system 3 and the error reporting method can be used in any environments.

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. An error reporting method for reporting errors in testing a computer system, the error reporting method comprising the steps of:

testing the computer system to find errors;
generating an error code corresponding to a specific error during the test; and
displaying the error code by permutation and combination of a light-on state, a light-off state, a quick-twinkle state, and a slow-twinkle state of a plurality of indicators.

2. The error reporting method according to claim 1, further comprising generating a display command.

3. The error reporting method according to claim 2, further comprising activating a displaying module in response to the display command.

4. The error reporting method according to claim 3, wherein the displaying module uses the light-on state to indicate errors and uses the light-off state to indicate no error.

5. The error reporting method according to claim 1, wherein the light-on state comprises the quick-twinkle state and the slow-twinkle state.

6. The error reporting method according to claim 3, wherein the indicators are installed in the displaying module, and comprise a first indicator, a second indicator and a third indicator.

7. The error reporting method according to claim 1, wherein the error code has an 8421 BCD code format.

8. An error reporting system comprising:
a basic input/output system comprising a power on self-test module for starting a power on self-test of a computer system, and an error reporting module configured for generating an error code corresponding to a specific error occurring during the power on self-test; and
a displaying module configured for displaying the error code by permutation and combination of a light-on state, a light-off state, a quick-twinkle state, and a slow-twinkle state of a plurality of indicators.

9. The error reporting system according to claim 8, wherein the error reporting module generates a display command after the error occurs during the test.

10. The error reporting system according to claim 9, wherein the error reporting system further comprises a display controlling module for activating the displaying module to display the error code in response to the display command.

11. The error reporting system according to claim 8, wherein the indicators are installed in the displaying module, and comprise a first indicator, a second indicator and a third indicator.

12. The error reporting system according to claim 8, wherein each of the indicators comprises the light-on state and the light-off state, and the light-on state comprises the quick-twinkle state and the slow-twinkle state.

13. The error reporting system according to claim 8, wherein the error code has an 8421 BCD code format.

14. A computer system comprising:
an error reporting system for reporting errors when testing the computer system, the error reporting system comprising:
a basic input/output system for starting a power on self-test of the computer system and for generating an error code corresponding to a specific error occurring during the power on self-test; and
a displaying module for displaying the error code by permutation and combination of a light-on state, a light-off state, a quick-twinkle state, and a slow-twinkle state of a plurality of indicators.

15. The computer system according to claim 14, wherein the basic input/output system comprises a power on self-test module for starting the power on self-test of the computer system.

16. The computer system according to claim 14, wherein the basic input/output system comprises an error reporting module for generating the error code.

17. The computer system according to claim 16, wherein the error reporting module generates a display command after the error occurs during the test.

18. The computer system according to claim 17, wherein the error reporting system further comprises a display controlling module for activating the displaying module to display the error code in response to the display command.

* * * * *